Patented July 10, 1945

2,380,185

UNITED STATES PATENT OFFICE 2,380,185

PRODUCTION OF HYDROXY ETHERS

Kenneth E. Marple, Edward C. Shokal, and Theodore W. Evans, Oakland, Calif., assignors to Shell Development Company, San Francisco, Calif., a corporation of Delaware No Drawing. Application November 6, 1942, Serial No. 464,936

9 Claims. (Cl. 260—615)

This invention relates to a catalytic process for the production of hydroxy ethers. More particularly the invention pertains to a catalytic process of reacting an epoxide compound with an alcoholic compound in the presence of a stannic halide or an alcohol or ether complex thereof as catalyst, the reaction yielding valuable hydroxy ethers.

It is known to react olefine oxides with alcohols under the influence of elevated temperatures but without the use of a catalyst. U. S. Patent No. 1,976,677 describes a process which functions in this manner, but the process described has the disadvantage of requiring the use of high pressures and temperatures for operation as well as utilizing a slow reaction rate owing to the fact that a catalyst which will increase the reaction rate is not employed. Others have proposed a number of catalysts for use in reacting an olefine oxide with an alcohol. Thus, for instance, U. S. Patent No. 2,010,726 and British Patent No. 271,169 describe the use of sulfuric acid, alkali metal alcoholates or alkali metal salts of the lower fatty acids as catalyst. U. S. Patent No. 2,094,100 mentions the use of other substances like phosphoric acid, hydrochloric acid, zinc chloride, ferric chloride, caustic soda, caustic potash and organic bases like pyridine, dimethyl aniline for catalysts in reacting olefine oxides with cellulose. Although these substances accelerate the different reactions to various degrees we have now found that stannic halides, and in particular stannic chloride, or an alcohol or ether complex thereof, are more active and are considerably more efficient and suitable as catalyst in reacting an epoxide compound with an alcoholic compound.

An object of the present invention is to provide a catalytic process for producing hydroxy ethers by reacting an epoxide compound with an alcoholic compound in the presence of a catalyst superior to those known heretofore.

Another object of the invention is to provide a practical and economical catalytic process which is adapted to the technical scale production of hydroxy ethers by reaction of epoxide compounds with organic hydroxy compounds.

A further object is to provide a process utilizing the highly active catalytic properties of stannic halides and alcohol or ether complexes thereof for the manufacture of hydroxy ethers.

These and other objects of the invention may be accomplished by the process of the invention which in its broad aspects comprises reacting an epoxide compound such as an alkylene oxide and substitution products thereof with an alcohol including substituted alcohols. The reaction involved in the production of the hydroxy ethers may be represented by the following general equation:

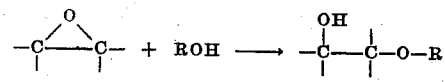

wherein

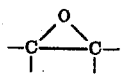

designates the reaction group of the epoxide compound, ROH designates the alcoholic compound and

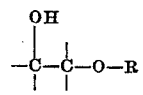

designates essential structure of the product, a hydroxy ether. We have found that this reaction can be made to proceed at a practical, rapid rate with a resultant high yield of the desired hydroxy ether if it is conducted in the liquid phase in the presence of a stannic halide. Stannic halides, and more particularly, stannic chloride, possess some peculiar property, not at present understood, which enables them to greatly increase the rate of the liquid phase reaction between epoxide compounds and an alcoholic compound.

The high catalytic activity of the stannic halide catalysts makes them attractive to employ in the process, since only small amounts are required to effect a substantially complete reaction in a short time. The actual amount of catalyst needed in the process, however, will be dependent upon a number of factors including the particular stannic halide used, the particular reactants employed, the water content of the reaction mixture and the operating conditions employed. In general, the larger the amount of catalyst present in the reaction mixture, the more rapid will be the reaction. Satisfactory results may be obtained ordinarily with catalyst concentrations in the reaction mixture in the very small amount of from 0.1 to 1 per cent. If advantageous and desired, more or less than this amount may be used.

Of the stannic halides, stannic chloride is the preferred catalyst for effecting and catalyzing the reaction of our process, owing to its high activity, although stannic bromide or stannic iodide may also be employed. Stannic fluoride is the least preferred of the stannic halides. While the stannic halide per se may be utilized as the catalyst, we have found that a complex of the stannic halide with an alcohol or ether is considerably more advantageous and useful than the metal halide alone. For instance, stannic chloride while being a liquid at normal temperature, is subject to decomposition and fuming by hydrolysis from moisture in the air which makes necessary special precautions in handling it. By preparing a complex of stannic chloride with an alcohol or ether, the handling of the catalyst is facilitated owing to the greater stability of the complex towards decomposition. The stannic halide complex compounds are formed by the interaction of the stannic halide and an alcohol or ether. The stannic halide and the ether or alcohol are brought together and commingled either in equivalent amounts for complex formation or with an excess of the organic constituent. The formation of the complex may cause evolution of heat so that it may be desirable to cool the alcohol or ether prior to adding the stannic halide thereto, in order to avoid temperatures which will decompose the formed complex. When excess alcohol or ether is used in making the complex, the excess is removed preferably by distillation in vacuo at a pressure sufficiently low that the temperature of the distillation is maintained below the decomposition temperature of the complex.

The complexes are formed with alcohols such as methyl alcohol, ethyl alcohol, propyl alcohol, isopropyl alcohol, butyl alcohol, secondary butyl alcohol, tertiary butyl alcohol, hexyl alcohol, octyl alcohol, allyl alcohol, crotyl alcohol and the like. In general, the complexes may be with any alcohol and, furthermore, they may be formed with the particular alcohol employed as reactant in the process of the invention of which representative examples thereof are given hereinafter. On the other hand, it may in some cases be more desirable to employ a complex of a different alcohol than that used as reactant. In the case of using a stannic halide ether complex, the ether used in preparing the complex is from such representative ethers as dimethyl ether, diethyl ether, diisopropyl ether, dibutyl ether, diallyl ether, ethyl tertiary butyl ether, methallyl isopropyl ether, dioxane, dichlorethyl ether, butyl monobromethyl ether and the like. The products of the process are ethers and, if desired, the stannic halide complex may be formed from this ether.

The stannic halide catalysts employed in the process are hydrolyzable compounds when in the presence of water. Furthermore, their catalytic activity is considerably impaired when they are in a hydrolyzed condition and larger amounts of catalyst are required to effect the reaction when the reactants contain appreciable amounts of water as compared to when they are substantially dry. Also, the hydrogen halide liberated by the hydrolysis of the metal halide may combine with the epoxide compound to form halohydrin types of by-products which may prove troublesome to remove from the desired product. It is therefore preferable for the reactants used in the execution of the invention to be in a substantially anhydrous condition.

The epoxide compound which may be used in the process are the compounds which contain not more than four atoms in the heterocyclic epoxide ring, i. e. compounds which contain 1,2- and 1,3- oxide groups. Representative compounds include the alkylene oxides such as ethylene oxide, propylene oxide, butene-1 oxide, butene-2 oxide, isobutylene oxide, trimethylene oxide, butadiene monoxide, butadiene dioxide, cyclopentylene oxide, styrene oxide, etc., as well as substituted alkylene oxides which contain various substituent groups in addition to the epoxide group like the epihalohydrins such as epichlorhydrin, epibromhydrin, alpha methyl epichlorhydrin, beta methyl epichlorhydrin, alpha alpha' dimethyl epibromhydrin, etc.; nitro epoxide compounds such as nitro glycide, beta ethyl nitro glycide, nitro styrene oxide, etc.; epoxide ethers such as methyl glycidyl ether, isopropyl glycidyl ether, secondary butyl beta methyl glycidyl ether, cyclopentyl glycidyl ether, phenyl glycidyl ether, etc.; epoxide thioethers such as ethyl glycidyl thioether, cyclohexyl alpha methyl thioether, tolyl glycidyl thioether, etc.; epoxide esters such as glycidyl acetate, glycidyl propionate, beta propyl glycidyl naphthenate, glycidyl benzoate, etc. and the like.

Any alcohol or alcoholic compound containing a truly alcoholic hydroxy group is reacted with the epoxide compound according to the process of this invention. By an "alcohol or alcoholic compound," reference is made in this specification and the appended claims to those compounds which, as are recognized in the art to which the invention relates, contain only one hydroxy group linked directly to a saturated carbon atom in the compound although the compounds may contain a plurality of these alcoholic hydroxy groups. The expression includes compounds wherein hydrogen is linked to the carbon skeleton of the compound like in ethyl alcohol or wherein other substituents besides alcoholic hydroxy groups are linked to the carbon skeleton, such as in ethylene chlorhydrin, which substituents are not reactive with epoxide compounds. The invention thus properly excludes reactions with compounds which are dissimilar from alcohols such as phenols which contain the hydroxy group linked to a carbon atom of the aromatic nucleus and hydrates of carbonyl compounds like chloral hydrate or formaldehyde hydrate which contain two hydroxyl groups linked to a single carbon atom as well as enols which contain the hydroxy group linked to an unsaturated carbon atom. There may be used either monohydric or polyhydric alcohols which subclass of reactants are embraced within the term "an alcohol" and the alcohols may be either primary, secondary or tertiary in character and may be saturated or unsaturated as well as substituted with various substituents as above noted. Examples of representative monohydric alcohols include such alcohols as methyl, ethyl, isopropyl, normal butyl, secondary butyl, tertiary butyl, tertiary amyl, lauryl, cetyl, alyl, crotyl, propargyl, cyclopentyl, cyclohexyl, cyclopentyl, benzyl, phenylethyl, furfuryl, etc. Among the polyhydric alcohols there may be mentioned ethylene glycol, propylene glycol, isobutylene glycol, trimethylene glycol, cyclopentene glycol, styrene glycol, glycerine, beta methyl glycerine, alpha phenyl glycerine, erythritol, penta-orthyritol, mannitol, sorbitol, etc. The term "an alcoholic compound" is used to designate both monohydric or polyhydric alcohols as well as substituted alcohols like such compounds as ethylene chlorhydrin, propylene bromhydrin, glycerine monochlorhydrin, glycerine dichlorhydrin, dichloro tertiary butyl alcohol, methyl glycerol ether, isopropyl glycerol thioether, methyl ethylene glycol ether, phenyl glycerol ether, diisopropyl glycerol ether, secondary butyl beta methyl glycerine ether, ethylene glycol monoacetate, trimethylene glycol monobutyrate, tertiary butyl glycerol ether monoacetate, isopropyl beta methyl glycerine thioether monobenzoate, ethyl lactate, dinitroglycerine, etc. Excluded from the meaning of the term "an alcoholic compound" as used herein are alcoholic compounds which contain in addition to an alcoholic hydroxy group, such groups as amino groups, carboxyl groups, carboxylic acid groups, etc., which are also reactive with the epoxide compound in competition with the hydroxy group.

The stannic halide catalyst functions particularly well with secondary and tertiary alcohols, these compounds being less reactive with the epoxide compound than are primary alcohols according to prior catalysts. Alcoholic compounds containing a secondary or tertiary alcoholic hydroxy group constitute a preferred class of reactants.

The molecular proportion of the alcohol employed in the process is preferably in considerable excess of the epoxide compound. Ordinarily a molecular ratio of at least two of the alcohol to one of the epoxide compound is used. High yields of the desired hydroxy ether may be obtained when the reaction mixture contains three to five mols of alcohol per mol of epoxide compound. The excess alcohol remaining after the reaction may be recovered, by distillation, for example, and returned to the process for the reaction with additional epoxide compound. If it is desired, however, to produce secondary or higher reaction products rather than the primary combination product of one molecule of epoxide compound with one molecule of alcohol, the ratio may be decreased so that the reaction of the primary hydroxy ether first formed with additional epoxide compound to give secondary or higher products may be favored.

The reaction is conducted at temperatures of from about −50° C. to 250° C. Cooling the mixture of reactants so that it is below room temperature, may, from about 10° C. to −50° C., when the stannic halide catalyst is added thereto either as the metal halide per se or the alcohol or ether complex thereof, is usually advantageous since such a procedure has an effect on the amount of catalyst which must be used to produce a desired reaction rate. In general, this procedure considerably reduces the amount of catalyst necessary as compared to when the catalyst is added to the reaction mixture at ordinary or elevated temperatures and is of importance in the technical scale manufacture of the hydroxy ethers wherein it is desirable to keep the catalyst consumption at a minimum. The reaction begins immediately upon contact of the reactants with the catalyst and while it may initially be slow at the low temperatures, it soon becomes vigorous with a resultant increase in temperature of the reaction mixture. In general, the reaction may be completed by heating the reaction mixture at its normal boiling temperature except when a low boiling reactant such as ethylene oxide, propylene oxide, etc., is employed. In such cases where higher temperatures than the normal boiling temperature of the reaction mixture are used, it is desirable to maintain a pressure on the reaction mixture at least equal to the total vapor pressure of the mixture at the operating temperature, since the reaction occurs in the liquid phase.

The process of the invention may be excuted in a variety of manners and is adaptable to batchwise, intermittent and continuous operation. For example, a mixture of the epoxide compound and the alcohol is prepared and may be cooled to a temperature below ordinary room temperature. To this mixture the metal halide catalyst is then added, and the mixture may be heated gently. The reaction between the epoxide compound and the alcohol is exothermic so that the reaction may become sufficiently rapid to evolve a considerable amount of heat which may raise and maintain the temperature at the boiling point for a period of time without further application of external heat. Owing to the spontaneous and possibly violent character of the reaction when using the stannic halide catalysts, it may be desirable to apply cooling to the reaction mixture, after initiating the reaction by heating, so as to control it. The reaction may be allowed to proceed satisfactorily with the reaction mixture contained in a vessel fitted with heating and cooling means as well as suitable condensing means, such as a reflux condenser, for condensing and returning any vapors of reactants which may be evolved. In order to assure completion of the reaction, the reaction mixture is heated or boiled for a period of time during which samples may be withdrawn and analyzed to determine when the reaction is substantially complete. At the completion of the reaction the catalyst may, if desired, be neutralized and destroyed by treatment with a basic-acting substance such as sodium carbonate although this is not imperative. The unreacted components of the reaction mixture and the products of the reaction may be separated in any suitable manner such as distillation.

An alternative method of operation is to add the catalyst to the alcoholic compound and subsequently introduce the epoxide compound either as an entirety or in portions into the mixture. In general, it is inadvisable to add the catalyst to the epoxide compound in the absence of the alcohol. This procedure is to be avoided because of the tendency of the epoxide compound to react with itself in the presence of the catalyst and form less valuable and usually undesirable by-products.

Continuous operation may be achieved by passing the mixture of reactants and catalyst through a tubular reactor, for example, at such a rate that substantially complete reaction is obtained during the time of residence of the mixture therein. The reactor is heated by any suitable means so that the mixture is at the desired temperature and pressure may be applied if necessary to keep the reactants liquid.

The invention is more clearly indicated by the following examples which are given for illustrative purposes only.

*Example I*

A mixture of about 6 mols of epichlorhydrin and 24 mols of isopropyl alcohol was cooled to 8° C. and about 0.012 mol of stannic chloride added thereto. The mixture was heated gently, whereupon it came to a boil spontaneously and it was then refluxed under a reflux condenser for approximately one-half hour, after which time the reaction was complete. About 2.5 gm. of sodium carbonate was added to destroy the stannic chloride. The unreacted alcohol was recovered from the mixture by distillation at atmospheric pressure, and the pressure then reduced to about 10 mm. to obtain the product. The desired isopropyl glyceryl chlorhydrin ether boiling at about 70° C. to 73° C. at 10 mm. was secured in a yield of approximately 93%.

Example II

A mixture of about 6 mols of epichlorhydrin and 24.3 mols of methyl alcohol was cooled in an ice bath. To the mixture was added about 0.036 mol of stannic chloride, and the mixture boiled. Upon completion of the reaction, no basic substance was added to destroy the catalyst. The excess alcohol was removed by distillation at atmospheric pressure and the product recovered by distillation in vacuo. A yield of about 88.4% of methyl glyceryl chlorhydrin ether was obtained which boiled at about 63° C. to 66° C. at 10 mm.

Example III

Using a ratio of about four mols of isopropyl alcohol and one mol of isobutylene oxide to which was added 0.01 mol of stannic chloride, the reaction mixture heated to boiling spontaneously upon addition of the catalyst. After the reaction, the stannic chloride was neutralized by adding about 6 gms. of sodium carbonate with 300 cc. of water, and the product distilled. The primary product boiling at 42 to 46° C. at 10 mm., was obtained in a 43.8% yield and had the probable structure: $(CH_3)_2CHOC(CH_3)_2CH_2OH$. A secondary product probably resulting from the isobutylene oxide reacting with the primary product was obtained in 10.9% yield and had the probable structure:

$(CH_3)_2CHOC(CH_3)_2CHOC(CH_3)_2CH_2OH$

Example IV

To one liter of isopropyl alcohol cooled to −73° C. was added 25 cc. of stannic chloride. A solid was formed at this temperature which went into solution above about −50° C. The excess isopropyl alcohol was then distilled off at a pressure of approximately 2 mm., the kettle temperature not rising above 18° C. at any time. This yielded 104 grams of a white hydroscopic solid. By assuming that all of the stannic chloride is in the solid, then it would contain 55.7 grams of stannic chloride and 48.3 grams of isopropyl alcohol. The formula $SnCl_4 \cdot (C_3H_7OH)_4$ requires 51.4 grams of alcohol and is probably correct for the solid. An approximate chlorine analysis showed 27.8% chlorine present. The theoretical chlorine for the above formula would amount to 28.4%.

This stannic chloride-isopropyl alcohol complex was used as a catalyst in reacting epichlorhydrin with isopropyl alcohol. About 3 mols of epichlorhydrin and 12 mols of isopropyl alcohol were cooled to −35° C. and 0.006 mol of the complex added and the solution gradually warmed. A very vigorous exothermic reaction set in which lasted probably 5 minutes. The solution was then refluxed for an additional 2 hours, after which the reaction was complete with the formation of the isopropyl ether of glycerine monochlorhydrin.

Example V

A mixture of about 12.45 mols of methyl alcohol and 3.11 mols of isopropyl glycidyl ether was chilled, and to it was added about 0.013 mol of stannic chloride. The mixture was heated gently whereupon a vigorous reaction ensued which caused the mixture to boil for about 8 minutes, after which heat was applied and the mixture boiled for an additional 15 minutes. The catalyst was neutralized with 2.5 gms. of sodium carbonate dissolved in 10 cc. of water. Distillation of the mixture yielded about 83.9% of isopropyl methyl glycerol diether boiling at about 74 to 77° C. at 10 mm.

Example VI

About 0.0025 mol stannic chloride was added to a cooled mixture consisting of about 2.0 mols of secondary butyl alcohol and 0.5 mol of epichlorhydrin. The mixture was heated and refluxed for about 17 hours. An analysis showed that the reaction was complete at the end of this time.

Example VII

A mixture of 2.0 mols of tertiary octyl alcohol and 0.5 mol of epichlorhydrin was chilled and about 0.005 mol of stannic chloride added. The mixture was boiled and after several hours a test on the reaction mixture indicated that the reaction was substantially complete.

Example VIII

About 94 gms. of ethylene oxide were dispersed through a sintered glass plate into a mixture of about 5.7 mols of cyclopentanol and 0.01 mol of stannic chloride maintained at a temperature of from 100 to 140° C. over a period of three and one-half hours. Approximately 10 gms. of unreacted ethylene oxide were collected in a cold trap; hence 84 gms. of ethylene oxide were absorbed. Four gms. of sodium carbonate were added and the mixture fractionated. About 4.19 mols of cyclopentanol were recovered and a yield of about 67% of monocyclopentyl ether of ethylene glycol was obtained. The product had a boiling point of 82.0° C. at 10 mm. pressure and the following values for density and refractive index: $d_4^{20}=0.994$ and $n_D^{20}=1.456$. A secondary reaction product was obtained in a 23% yield. It was identified as the monocyclopentyl ether of diethylene glycol.

The hydroxy ethers prepared according to the process are very valuable and useful substances. They may be used as solvents and extractants in a variety of industrial applications, as intermediates in the preparation of various chemicals, as ingredients of insecticide and fungicide compositions and in many other miscellaneous applications. The novel monocyclopentyl ethers of polyhydric alcohols are a particularly useful class of compounds which may be used for the synthesis of various compounds owing to the presence of the cyclopentyl group in these compounds. The cyclopentyl group, quite unexpectedly from knowledge of homologous compounds, in these compounds make them especially suited for preparation of various pharmaceutical and medicinal compounds and compositions.

This application is a continuation-in-part of our copending application Serial No. 305,166 filed November 18, 1939, now Patent No. 2,327,053.

We claim as our invention:

1. A process for the production of a hydroxy ether which comprises reacting epichlorhydrin with isopropyl alcohol in the presence of a stannic chloride-isopropyl alcohol complex.

2. A process for the production of a hydroxy ether, which comprises reacting epichlorhydrin with isopropyl alcohol in the presence of stannic chloride.

3. A process for the production of a hydroxy ether which comprises reacting an epoxide compound with a monohydric secondary alcohol in the presence of stannic chloride-isopropyl alcohol complex.

4. A process for the production of a hydroxy ether which comprises reacting an epoxide compound with a monohydric secondary alcohol in the presence of stannic chloride.

5. A process for the production of a hydroxy ether which comprises reacting an epoxide compound with a monohydric tertiary alcohol in the presence of a stannic chloride-alcohol complex.

6. A process for the production of a hydroxy ether which comprises reacting an epoxide compound with a monohydric tertiary alcohol in the presence of stannic chloride.

7. A process for the production of a hydroxy ether which comprises reacting an epoxide compound with a monohydric alcohol in the presence of a stannic halide-alcohol complex.

8. A process for the production of a hydroxy ether which comprises reacting an alkylene oxide with a monohydric alcohol in the presence of stannic chloride.

9. A process for the production of a hydroxy ether which comprises reacting an epoxide compound with a monohydric alcohol in the presence of a stannic halide.

KENNETH E. MARPLE.
EDWARD C. SHOKAL.
THEODORE W. EVANS.